C. D. PRUITT.
TRANSMISSION AND CHANGE SPEED MECHANISM.
APPLICATION FILED JAN. 15, 1919.
1,362,507.
Patented Dec. 14, 1920.
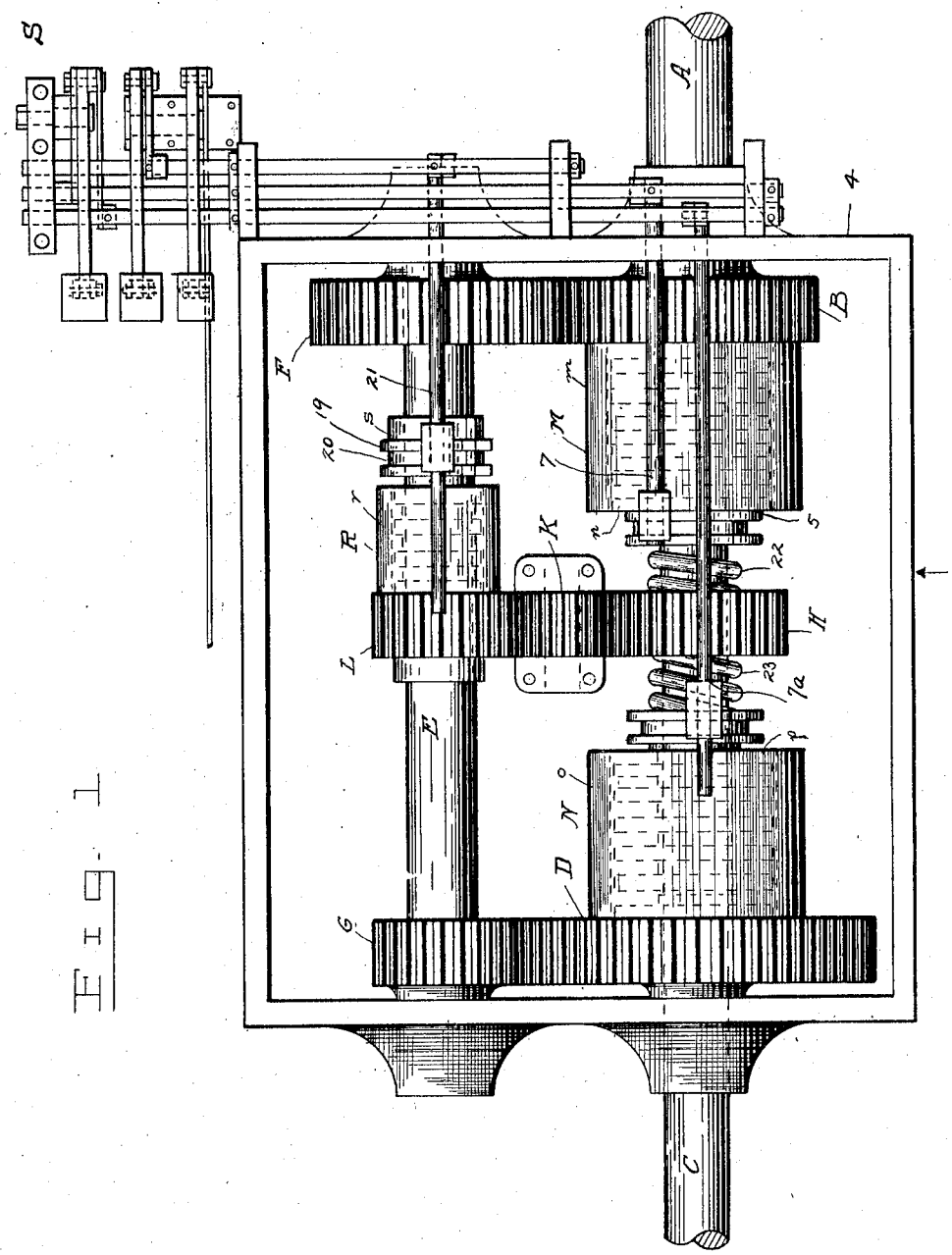
Inventor,
Conrad D. Pruitt.
By
His Attorney.

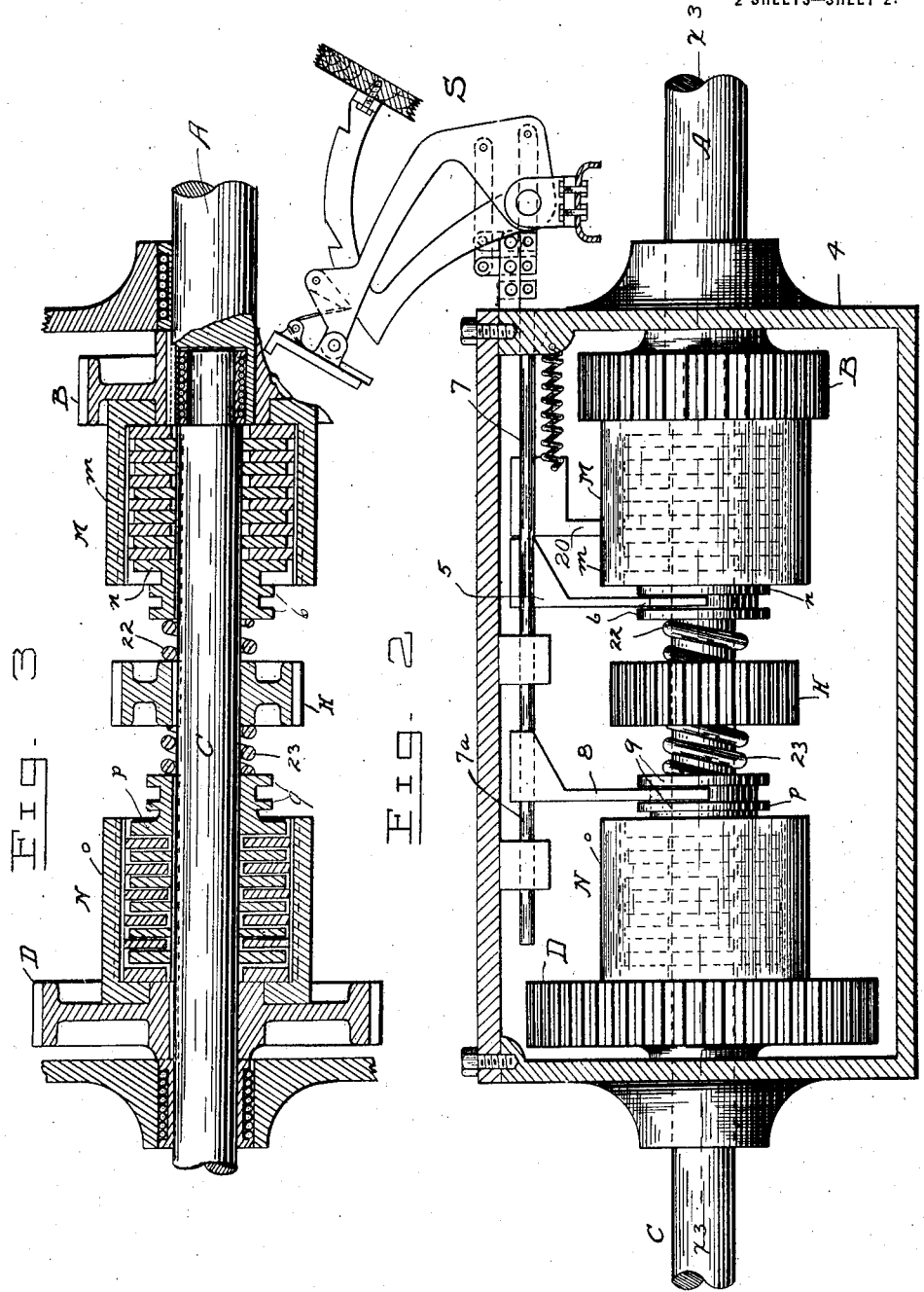

UNITED STATES PATENT OFFICE.

CONRAD D. PRUITT, OF LOS ANGELES, CALIFORNIA, ASSIGNOR OF ONE-HALF TO RALPH L. VAN DUSEN, OF LOS ANGELES, CALIFORNIA.

TRANSMISSION AND CHANGE-SPEED MECHANISM.

1,362,507.                     Specification of Letters Patent.      Patented Dec. 14, 1920.

Application filed January 15, 1919. Serial No. 271,286.

*To all whom it may concern:*

Be it known that I, CONRAD D. PRUITT, a citizen of the United States, residing at Los Angeles, in the county of Los Angeles and State of California, have invented new and useful Improvements in Transmission and Change-Speed Mechanism, of which the following is a specification.

This invention relates to transmission and change speed mechanism, for use in connection with an arrangement of power-consuming mechanisms and devices, and particularly adapted for use in driving motor vehicles. The invention has for its object to provide improved mechanism of the character stated which will provide for power transmission and change of speed and reverse of direction of motion in such mechanism with transmitting elements, such as gears, always in co-engagement or mesh, and which mechanism in these respects and others will be generally superior in simplicity and inexpensiveness of construction and organization, taken in connection with reliability, durability, positiveness, facility and surety in control, and general serviceability and efficiency.

With the above and other objects in view, the invention consists in the novel and useful provision, formation, construction, combination and association of parts, members and features, all as hereinafter described, shown in the drawings, and finally pointed out in claims.

In the drawings:

Figure 1 is a top plan view of power transmission and change speed mechanism, constructed and organized to embody the invention, parts being broken away for convenience in illustration;

Fig. 2 is a side elevation of the construction shown in Fig. 1, looking in the direction of the arrow at the bottom of Fig. 1; and Fig. 3 is a detail fragmentary longitudinal sectional view taken upon the line $x^3$—$x^3$, Fig. 2.

Corresponding parts in all the figures are designated by the same reference characters.

Referring with particularity to the drawing, the power transmission and change speed and motion-reversing mechanism therein shown, comprises a main or drive shaft A, which is provided with a fixed gear B. The drive, either in high, low, or low reverse, is through a driven shaft C upon which is loosely mounted a gear D. These shafts A and C are suitably mounted in a frame 4, as are the other transmission mechanism features hereinafter to be referred to, and the driven shaft C is disposed in end-to-end relation with the drive shaft A, being conveniently journaled in the customary manner within the gear B which is upon the end of the shaft A. E designates a counter-shaft provided with fixed gears F, and G, the former of which meshes with the gear B at all times, and the latter of which meshes at all times with the gear D. Fast upon the shaft C between the gears B and D is a gear H which at all times meshes with a spur gear K which in turn at all times meshes with a gear L loose upon the shaft E. A clutch device M, shown as a plate-clutch is provided as between the gear B and the driven shaft C, one member $m$ being fixed to said gear B and the other member $n$ being keyed to the driven shaft C. A clutch device N is provided as between the gear D and the driven shaft C, one member $o$ being fast to said gear, and the other member $p$ being keyed upon the shaft C. A clutch device R is provided as between the gear L and the shaft E, one member $r$ being fast to the gear L, and the other member $s$ being keyed to the shaft E.

In order to render each of the clutch devices effective the portion $n$ of the clutch M is provided with a collar 6 loosely surrounding the driven shaft C. A yoke 5 coöperates with the collar 6 and is actuated so that the plate members $n$ and $m$ may coact with each other, by shifting the rod 7 either inwardly or outwardly. The clutch N is likewise provided with a collar 9 attached to a set of plates as $p$ of said clutch, and the collar 9 is operated by a yoke 8 surrounding same, which yoke in turn is connected with the rod $7^a$. The clutch R located upon the counter shaft E has one set of its plates as $s$ fastened to a collar 19, which collar is engaged by a yoke 20 fastened to a rod 21. The operation of the clutch N and the clutch R is the same as that described for the clutch M. S designates means for operating the rods 7, $7^a$, and 21, and requires no description in that it is merely standard or preferred means of any type for these purposes, which in no manner enters into any of the considerations of the present invention.

Preferably the several journals for the shafts A, C and E are journaled in ball bearings, as indicated in Fig. 3, but any suitable type of bearings may be employed.

Coil springs 22 and 23 normally hold the members of the clutches M and N effective or in clutching relation, such springs being mounted respectively between the member $n$ of the clutch M and the gear H in one case, and between the member $p$ and the gear H in the other case.

The operation of the mechanism will be evident from the foregoing description taken in connection with the accompanying drawings and the following statement:

Power being applied to the shaft A, if it be desired to operate the driven shaft C at high speed, the clutch device M is rendered effective, thus clutching the gear B to the driven shaft C, the clutch N at the same time being rendered inoperative. If it be desired to operate the driven shaft C at low speed, the clutch M is rendered inoperative, but the clutch N is rendered operative, so that the transmission is through the gears B and F, the counter shaft E, the gears G and D, and the clutch N. If it be desired to operate the driven shaft C in the reverse, and in the one speed provided, namely, the low speed, the clutch M is rendered inoperative, the clutch N is rendered inoperative, and the clutch R is rendered operative. The transmission is then from the shaft A through the gears B and F through the shaft E, and the gears L, K and H, thus reversing the direction of rotation of the driven shaft C and rotating it at low speed.

It will be noted that all of the gears are at all times in mesh, and therefore the controls, being through clutch members, no unmeshing and meshing of gears exists, with the attendant dangers of gear stripping and mutilation which are present in transmission mechanisms in which the gears themselves are shifted in changing speed or reversing. Likewise, the attendant noise and clatter incidental to such gear shifting is eliminated. A more positive and reliable transmission is provided for, without the attendant objections noted, and others which will suggest themselves, the transmitting gears being at all times ready to act responsive to the operation of the several clutches.

It will be manifest that many changes and variations may be made in practising the invention, in departure from the particular features, shown and described.

Having thus disclosed my invention, I claim and desire to secure by Letters Patent:

1. In a device of the character described, comprising a frame member, a driving shaft, a driven shaft and a counter shaft journaled in said frame, a gear fixedly mounted upon said driving shaft and within the frame member, a clutch, one portion of which is attached to said gear and the other portion of which is attached to the driven shaft, a gear loosely mounted upon said driven shaft, a clutch one portion of which is connected with said gear and the other portion of which is attached to the driven shaft; gears fixedly mounted at each end of the counter shaft one of which meshes with the gear on the driven shaft and the other of which meshes with the gear on the driving shaft; a gear loosely mounted upon said counter shaft, a clutch a portion of which is fixedly attached to said gear and the other portion of which is fixedly mounted upon said counter shaft; a gear fixedly mounted upon said driven shaft and disposed between the driving shaft clutch and the driven shaft clutch members, and an idler gear meshing with said last named gear and the gear which is loosely mounted upon the counter shaft; there being means provided for rendering the different clutch means effective upon a rotation of the driving shaft.

2. In a device of the character described, comprising a frame member, a driving shaft, a driven shaft and a counter shaft journaled in said frame, a gear fixedly mounted upon said driving shaft and within the frame member, a clutch one portion of which is attached to said gear and the other portion of which is attached to the driven shaft, a gear loosely mounted upon said driven shaft, a clutch one portion of which is connected with said gear and the other portion of which is attached to the driven shaft; gears fixedly mounted at each end of the counter shaft one of which meshes with the gear on the driven shaft and the other of which meshes with the gear on the driving shaft; a gear loosely mounted upon said counter shaft, a clutch a portion of which is fixedly attached to said gear and the other portion of which is fixedly mounted upon said counter shaft; a gear fixedly mounted upon said driven shaft and disposed between the driving shaft clutch and the driven shaft clutch members, and an idler gear meshing with said last named gear and the gear which is loosely mounted upon the counter shaft; there being means provided for rendering the different clutch means effective upon a rotation of the driving shaft; yielding means being provided normally holding said clutches effective.

In testimony whereof, I have signed my name to this specification in the presence of two subscribing witnesses.

CONRAD D. PRUITT.

Witnesses:
J. CALVIN BROWN,
EDNA TURNER.